US012123591B2

(12) United States Patent
Jha et al.

(10) Patent No.: US 12,123,591 B2
(45) Date of Patent: Oct. 22, 2024

(54) AIRCRAFT READING LIGHT, AIRCRAFT COMPRISING AN AIRCRAFT READING LIGHT, AND METHOD OF OPERATING AN AIRCRAFT READING LIGHT (71) Applicant: Goodrich Lighting Systems GmbH & Co. KG, Lippstadt (DE)

(72) Inventors: Anil Kumar Jha, Lippstadt (DE); Andre Hessling-Von Heimendahl, Koblenz (DE); Carsten Pawliczek, Lippstadt (DE); Jens Leuschner, Möhnesee (DE)

(73) Assignee: GOODRICH LIGHTING SYSTEMS GMBH & CO. KG, Lippstadt (DE)

( * ) Notice: Subject to any disclaimer, the term of this patent is extended or adjusted under 35 U.S.C. 154(b) by 0 days.

(21) Appl. No.: 18/480,228

(22) Filed: Oct. 3, 2023

(65) Prior Publication Data
US 2024/0117952 A1 Apr. 11, 2024

(30) Foreign Application Priority Data

Oct. 5, 2022 (EP) ..................... 22199914

(51) Int. Cl.
F21V 7/04 (2006.01)
B64D 11/00 (2006.01)
F21Y 113/13 (2016.01)

(52) U.S. Cl.
CPC ............... F21V 7/04 (2013.01); B64D 11/00 (2013.01); B64D 2011/0053 (2013.01); B64D 2203/00 (2013.01); F21Y 2113/13 (2016.08)

(58) Field of Classification Search
CPC ............ B64D 11/00; B64D 2011/0038; B64D 2011/0053; B64D 2203/00; F21V 7/04–09; F21Y 2113/10–17
See application file for complete search history.

(56) References Cited

U.S. PATENT DOCUMENTS 8,556,438 B2   10/2013   Lee et al.
9,045,079 B2    6/2015   Boomgarden et al.

FOREIGN PATENT DOCUMENTS

EP    2525143 A1    11/2012
EP    2546102 A1     1/2013
EP    3763569 A1     1/2021
EP    3974323 A1     3/2022
WO  2012032455 A1    3/2012

OTHER PUBLICATIONS

European Search Report for Application No. 22199914.7, mailed Mar. 13, 2023, 8 pages.

Primary Examiner — Jason M Han
(74) Attorney, Agent, or Firm — CANTOR COLBURN LLP (57) ABSTRACT An aircraft reading light with a color-tunable reading light output includes: a white light source for emitting white light; a colored light source for emitting colored light; and an optical element, which is arranged for directing colored light that is emitted by the colored light source onto the white light source for being diffusely reflected at the white light source. The colored light source is controllable independently from the white light source.

17 Claims, 5 Drawing Sheets

AIRCRAFT READING LIGHT, AIRCRAFT COMPRISING AN AIRCRAFT READING LIGHT, AND METHOD OF OPERATING AN AIRCRAFT READING LIGHT

CROSS REFERENCE TO RELATED APPLICATIONS

This application claims priority to European Patent Application No. 22199914.7 filed Oct. 5, 2022, the entire contents of which is incorporated herein by reference.

FIELD OF THE INVENTION

The present invention is in the field of interior aircraft lights. The present invention is in particular related to aircraft reading lights provided at passenger seats in aircraft. The present invention is further related to aircraft comprising such aircraft reading lights, and to a method of operating such an aircraft reading light.

BACKGROUND

Passenger aircraft, such as commercial air planes, usually have a passenger cabin comprising a plurality of passenger seats and a plurality of aircraft reading lights. The aircraft reading lights are commonly arranged above the passenger seats, in order to allow passengers, sitting in the passenger seats, to read even if the illumination within the passenger cabin is dimmed low or switched off.

Passenger reading lights usually emit white light. Different manufacturers, different aircraft operators and/or different passengers may desire different shades of white light to be emitted by the passenger reading lights. It may also be desired that the color difference between the light outputs of different passenger reading lights is less than the minimum LED color binning that is commercially available.

Accordingly, it would be beneficial to provide an aircraft reading light that allows for adjusting a color shade of the light output emitted by the aircraft reading light.

SUMMARY

Exemplary embodiments of the invention include an aircraft reading light, which is capable to provide a color-tunable reading light output, the aircraft reading light comprising a white light source for emitting white light; a colored light source for emitting colored light; and an optical element, which is arranged for directing colored light that is emitted by the colored light source onto the white light source for being diffusely reflected at the white light source; wherein the colored light source is controllable independently from the white light source.

Exemplary embodiments of the invention further include an aircraft comprising at least one aircraft reading light according to an embodiment of the invention.

Exemplary embodiments of the invention also include a method of operating an aircraft reading light, wherein the aircraft reading light comprises a white light source for emitting white light; at least one colored light source for emitting colored light; and at least one optical element, which is arranged for directing colored light that is emitted by the at least one colored light source onto the white light source for being diffusely reflected by the white light source; wherein the method includes tuning a color shade of a reading light output of the aircraft reading light by controlling an intensity of a white light emission, which is emitted by the white light source, and/or controlling at least one colored light emission, which is emitted by the at least one colored light source. Controlling the intensity of the white light emission and/or controlling the intensity of the at least one colored light emission may in particular comprise setting the reading light output to a predetermined shade of white light.

Exemplary embodiments of the invention may allow for adjusting the color shade of the reading light output emitted by an aircraft reading light. Exemplary embodiments of the invention may in particular allow for emitting white light with different shades of white from the same aircraft reading light.

The color temperature of the reading light output may, for example, be adjustable between a high color temperature, e.g. a correlated color temperature of more than 4000 K, which corresponds to "cold" white light, and a low color temperature, e.g. a correlated color temperature of less than 3300 K, which corresponds to "warm" white light.

Exemplary embodiments of the invention may further allow for adjusting the color shades of the reading light outputs of a plurality of aircraft reading lights so that the color difference between the reading light outputs of any given pair of passenger reading lights is less than a predefined threshold. The predefined threshold may be set to a value below the commercially available minimum LED color binning.

Since, according to exemplary embodiments of the invention, the colored light, which is emitted by the colored light source, is directed to and reflected at the white light source, the white light source may act as a common origin for the white light component, which is emitted by the white light source, and the colored light component, which is emitted by the colored light source. The white light source may act as a common origin for the combination of light components that jointly form the reading light output of the aircraft reading light.

Outputting the white and colored light components from a common origin may considerably reduce the risk of "color fringing" at the outer edges of the reading light output, i.e. the risk of forming undesired colored portions at the outer edges of the reading light output, which may occur when light components of different colors, which are emitted from different origins, are mixed for forming a combined light output.

An aircraft reading light and a method of operating an aircraft reading light according to exemplary embodiments of the invention may allow for the provision of a reading light output that has an adjustable color, in particular an adjustable shade of white, and that is highly uniform over the whole cross-section of the reading light output, in particular highly uniform at the outer edges of the reading light output.

In an embodiment, the white light source may be controllable independently from the colored light source. This may increase the flexibility of adjusting the reading light output emitted by the aircraft reading light.

In an embodiment, the colored light may be reflected from an outer surface of the white light source. In particular, the colored light may be reflected from an upper surface of the white light source, with the upper surface facing away from a support, such as a printed circuit board, supporting the white light source. The outer surface of the white light source may be a very effective means for reflecting the colored light. It is also possible that the colored light penetrates somewhat into the white light source and is diffusely reflected at the inner structure of the white light source.

In an embodiment, the aircraft reading light comprises a diffusely reflective coating or a diffusely reflective element, such as a diffusor. The diffusely reflective coating or the diffusely reflective element may be applied to or mounted at the white light source for diffusely reflecting the light that is emitted by the colored light source and directed onto the white light source. Such diffusely reflective coating or diffusely reflective element may enhance the reflection of the colored light at the white light source, thereby increasing the efficiency of the aircraft reading light. It may further result in a more homogeneous output of white light from the white light source.

In an embodiment, at least a portion of the colored light enters into the white light source and is diffusely reflected by internal components of the white light source. The colored light may in particular be reflected by light emitting components, such as a light emitting semiconductor chip, of the white light source.

Controlling the intensities of the light that is emitted by the each of the white and colored light sources may include setting the intensities of the light that is emitted by the white and colored light sources once when the aircraft reading light is manufactured, or when the aircraft reading light is installed within an aircraft. In such an embodiment, the intensities of the light that is emitted by the white and colored light sources may not be adjusted during operation of the aircraft reading light. Instead, the intensities of the light emitted by the white and colored light sources and, in consequence, the color shade of the reading light output, as emitted by the aircraft reading light, remains fixed after the aircraft reading light has been installed within the aircraft. The intensities of the light, emitted by the white and colored light sources, may be adjusted only by a mechanic during maintenance.

In an embodiment, the aircraft reading light is configured to allow cabin personnel and/or passengers to adjust the color shade of the reading light output, emitted by the aircraft reading light, according to the passenger's personal needs and/or according to the aircraft operator's lighting scheme. In particular, the aircraft reading light may be configured to allow for an adaptive, individual controlling of the intensities of the light, emitted by the white and colored light sources, during the operation of the aircraft reading light.

In an embodiment, the white light source is a white LED or a combination of white LEDs. The colored light source may be a colored LED or a combination of colored LEDs. LEDs may provide reliable light sources, which have a high efficiency and a long lifetime, at low costs.

In an embodiment, the aircraft reading light comprises a plurality of colored light sources. The plurality of colored light sources may in particular include two, three, four, five, six, seven, eight, nine, ten, or more than ten colored light sources, In an embodiment, the plurality of colored light sources include light sources which are configured for emitting light of different colors. The plurality of colored light sources may in particular include colored light sources that are configured for emitting red, green, blue, amber, orange or cyan light. Providing a plurality of colored light sources that are configured for emitting light of different colors may allow for adjusting the color of the reading light output of the aircraft reading light over a wide range of colors, in particular over a wide range of shades of white color. If desired, reading light outputs having colors other than white may be output as well.

In an embodiment, the plurality of colored light sources are controllable independently from the white light source. The plurality of colored light sources may also be controllable independently from each other. Adjusting the plurality of light sources independently from each other may allow for adjusting the color of the reading light output of the aircraft reading light over a wide range of different colors, in particular over a wide range of shades of white color.

In an embodiment, the optical element, which is arranged for directing colored light that is emitted by the colored light source onto the white light source, comprises a reflector for reflecting the colored light onto the white light source. The reflector may be a standalone component or may be a reflective portion/a particular reflective portion of a more extended structure/more extended optical component. The implementation of the optical element as a reflector may provide for high efficiency in directing the colored light onto the white light source.

In an embodiment, the reflector is an ellipsoidal reflector. In case the reflector is an ellipsoidal reflector, the colored light source may be arranged in a first focal point of the ellipsoidal reflector, and the white light source may be arranged in a second focal point of the ellipsoidal reflector. Arranging the white and colored light sources in the focal points of an ellipsoidal reflector may allow for directing the colored light onto the white light source very efficiently.

In an embodiment, the aircraft reading light comprises a plurality of optical elements, wherein each of the plurality of optical elements may be arranged for directing colored light that is emitted by one of a plurality of colored light sources onto the white light source for being diffusely reflected at the white light source. In such an embodiment, each of the optical elements may comprise a reflector, in particular an ellipsoidal reflector.

Assigning an optical element to each of a plurality of colored light sources may allow for directing the colored light, which is emitted by the plurality of colored light sources, very efficiently onto the white light source, because each optical element may be individually adapted to/arranged for the respectively assigned colored light source.

In an embodiment, the plurality of optical elements are part of an integrated optical structure, in particular part of an extended reflector structure. Integrating the plurality of optical elements into an integrated optical structure may reduce the number of components of the aircraft reading light. In consequence, the aircraft reading light may be manufactured highly efficiently and/or at comparably low cost.

In an embodiment, the plurality of colored light sources are arranged around the white light source. The plurality of colored light sources may in particular be arranged along a circular contour, which is centered at the white light source, or along an elliptical contour around the white light source. The plurality of colored light sources may also be arranged along a polygonal contour around the white light source. Such an arrangement of the colored light sources around the white light source may allow for a space saving arrangement of the colored light sources. It may further allow for a highly effective directing of the colored light, which is emitted by the plurality of colored light sources, onto the white light source, for example by an integrated optical structure.

In an embodiment, the aircraft reading light may comprise an extended reflector element, in particular an annular reflector element, which is arranged over the plurality of colored light sources. A plurality of reflectors may be formed on the inside of the annular reflector element and may face the plurality of colored light sources. The plurality of reflectors may be formed as a plurality of reflective portions/reflective surfaces on the inside of the annular reflector element. Each of the plurality of reflectors may be arranged for directing the colored light that is emitted by one of the plurality of colored light sources onto the white light source for being diffusely reflected at the white light source. The annular reflector element may for example have the shape of a petal. The annular reflector element may provide for a highly effective integrated optical structure, which includes a plurality of reflectors and which may be manufactured and assembled at low costs.

In an embodiment, the aircraft reading light further comprises projection optics. The projection optics is arranged for forming the reading light output, which is emitted/output by the aircraft reading light, from the light that is emitted by the white light source and from the light that is emitted by the colored light source(s) and reflected at the white light source. The projection optics is a means for simultaneously affecting the white light emission, as emitted by the white light source, and the colored light emission(s), as emitted by the colored light source(s) and reflected by the optical element(s), at least insofar as the white light emission and the reflected colored light emission(s) leave the white light source in similar directions.

In an embodiment, the projection optics comprises one or more lenses and/or one or more reflectors and/or one or more shutters. In a particular embodiment, the projection optics comprises a collimating lens, and the annular reflector element acts as a shutter that blocks light from the white light source and/or the colored light source(s) that is not directed towards the collimating lens.

The projection optics may be adjustable. In this way, the projection optics may allow for an adjusting of the reading light output emitted by the aircraft reading light. The projection optics may allow for an adjusting of the extension of the reading light output on a target surface, such as on a foldable passenger table. The projection optics may in particular comprise a plurality of optical components, such as lenses and/or reflectors, which are movable with respect to each other, in order to allow for adjusting the reading light output of the aircraft reading light.

In an embodiment, the aircraft reading light further comprises a reading light controller, which is configured for controlling an operation of the white light source and an operation of the colored light source or an operation of the plurality of colored light sources. The reading light controller may in particular be configured for controlling an intensity of the white light, which is emitted by the white light source, and an intensity of the colored light, which is emitted by the colored light source or by the plurality of colored light sources. Providing a reading light controller may be an effective way of enabling an independent control of the white light source and the colored light source(s) and may thus allow for a convenient way of adjusting the color shade of the reading light output, as emitted by the aircraft reading light.

In an embodiment, the white light source and the colored light source(s) are mounted to a common light source support. The light sources may in particular be mounted to a common printed circuit board. The common printed circuit board may comprise electric paths for supplying electric power to the light sources. In an embodiment, the optical element(s) may be mounted to the common light source support as well. Providing a common light source support, which supports the light sources and which optionally also supports the optical element(s), may result in a compact structure of the aircraft reading light and may contribute to an easy installation in an aircraft.

Exemplary embodiments of the invention also include an aircraft reading light system that comprises a plurality of aircraft reading lights according to exemplary embodiments of the invention. The aircraft reading light system may be configured to provide the reading light outputs of the plurality of aircraft reading lights with substantially the same color shade, in particular the same shade of white. In this way, a patchwork of different color shades within the aircraft, in particular within a passenger cabin of the aircraft, may be avoided.

The reading light controllers of the plurality of aircraft reading lights of the aircraft reading light system may be configured for communicating with a master controller. The master controller may be configured for setting a common color shade, in particular a common shade of white, for the reading light outputs of the plurality of aircraft reading lights. The reading light controllers of the individual aircraft reading light may be configured to adjust the reading light output, which is emitted by the respective aircraft reading light, accordingly.

In an embodiment, the color shades of the light outputs, emitted by the plurality of aircraft reading lights, may be individually adjustable. This may allow for adjusting the reading light output of each of the plurality of aircraft reading lights to the personal demand of a passenger using the respective aircraft reading light.

Exemplary embodiments of the invention also include an aircraft including at least one aircraft reading light according to an exemplary embodiment of the invention and/or an aircraft reading light system according to an exemplary embodiment of the invention.

BRIEF DESCRIPTION OF THE DRAWINGS

Further exemplary embodiments of the invention are described below with respect to the accompanying drawings, wherein.

DETAILED DESCRIPTION

Figure 1:
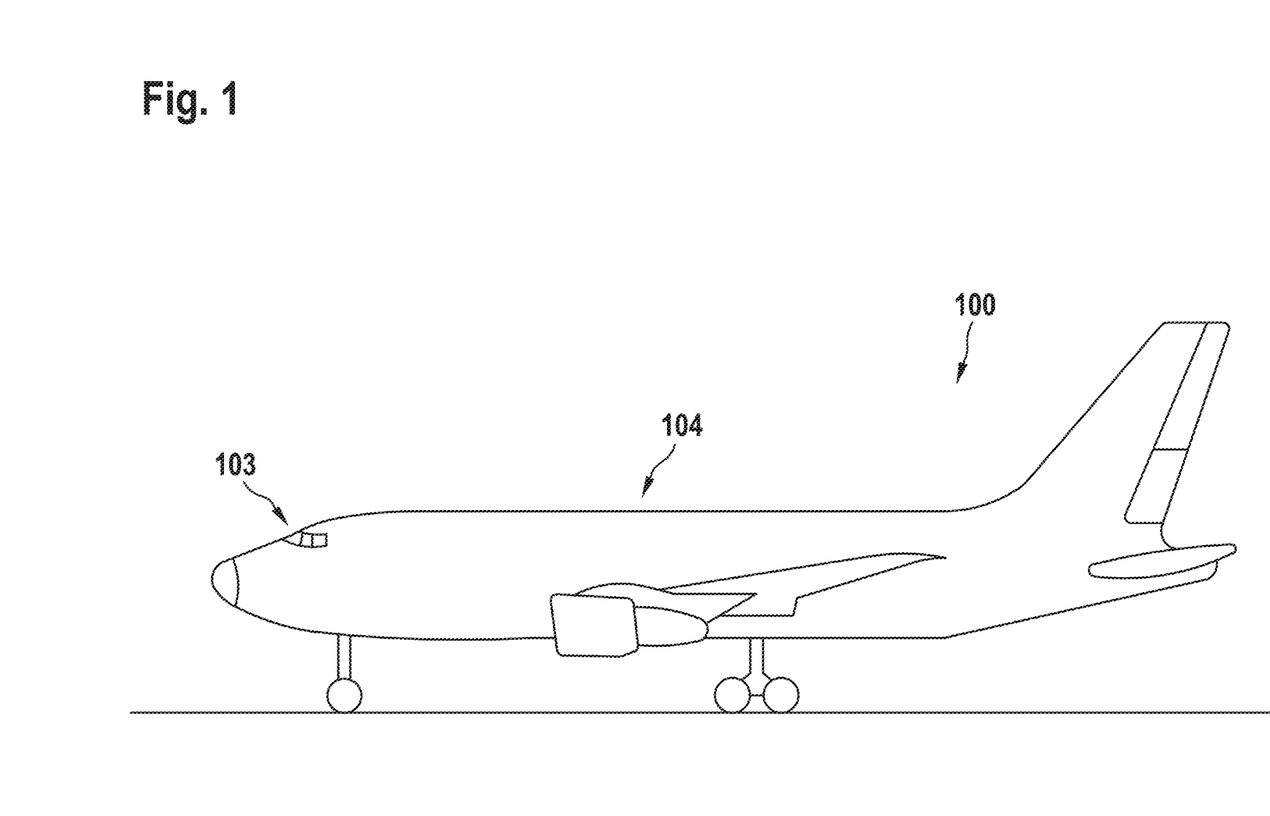
FIG. 1 depicts a schematic side view of an aircraft, in particular of an air plane, which may be equipped with an aircraft reading light system in accordance with an exemplary embodiment of the invention/which may be equipped with a plurality of aircraft reading lights in accordance with exemplary embodiments of the invention.

FIG. 1 depicts a schematic side view of an aircraft 100, in particular of an airplane, in accordance with an exemplary embodiment of the invention. In the exemplary embodiment shown in FIG. 1, the aircraft 100 is a large passenger airplane comprising a cockpit 103 and a passenger cabin 104. The aircraft 100 may be a commercial passenger airplane, a private airplane, or a military aircraft. The aircraft 100 may have a plurality of aircraft reading lights according to exemplary embodiments of the invention installed therein. It is also possible that aircraft reading lights according to exemplary embodiments of the invention are installed in a rotorcraft, such as a helicopter.

Figure 2A:
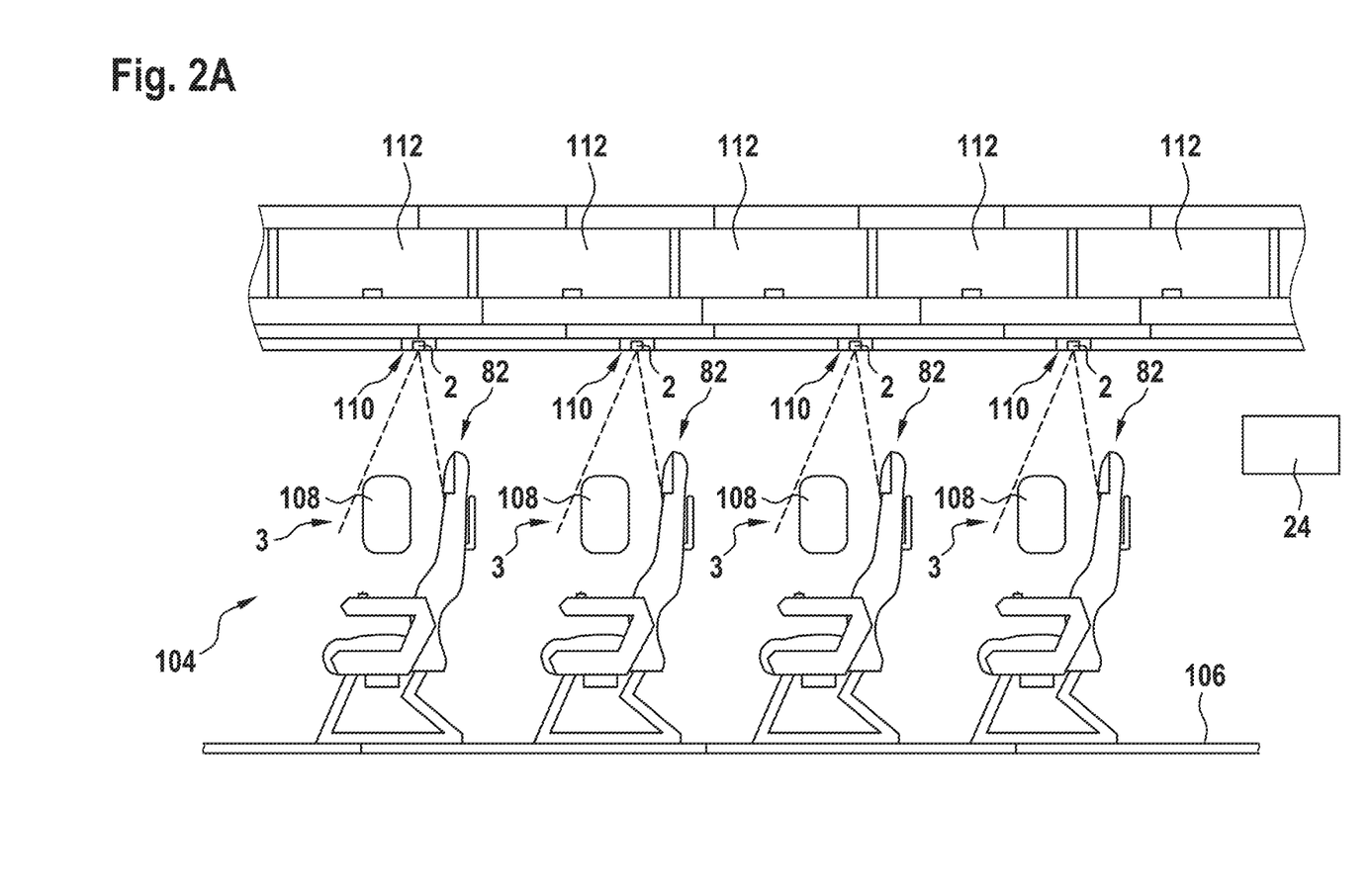
FIG. 2A depicts a schematic longitudinal cross-sectional view of a section of a passenger cabin of the aircraft shown in FIG. 1.

FIG. 2A depicts a schematic longitudinal cross-sectional view of a section of the passenger cabin 104 of the aircraft 100 shown in FIG. 1.

Four seats 82, also referred to as passenger seats 82, are shown in FIG. 2A. The passenger seats 82 are mounted to the floor 106 of the passenger cabin 104. Each of the depicted passenger seats 82 belongs to a different seat row.

For each of the seat rows, a window 108 is provided, which allows the passengers to view the outside of the aircraft 100. Further, a plurality of overhead baggage compartments 112 are shown. The overhead baggage compartments 112 provide storage space for the passengers' baggage.

Each seat row includes a plurality, for example two or three, passenger seats 82, which are arranged next to each other, perpendicular to the viewing plane of FIG. 2A. The additional passenger seats 82 of each seat row are not visible in FIG. 2A, as they are arranged behind and therefore hidden by the depicted first passenger seats (aisle seats) 82 of each seat row.

Passenger service units ("PSUs") 110 comprising aircraft reading lights 2 according to exemplary embodiments of the invention are provided above the passenger seats 82. Details of the passenger service units 110 will be discussed further below with reference to FIG. 2B.

Usually, a single aircraft reading light 2 is associated with each of the passenger seats 82, respectively. In particular, each aircraft reading light 2 may be associated with one of the passenger seats 82 and may be configured for emitting a light output 3 towards the associated passenger seat 82. The aircraft aircraft reading lights 2 may therefore also be referred to as passenger reading lights 2.

The light outputs 3 of the aircraft reading lights 2 may be configured for providing sufficient illumination to each passenger seat 82, without providing unnecessary illumination of neighboring passenger seats 82.

The combination of various aircraft reading lights 2 within the passenger cabin 104 may constitute an aircraft reading light system.

The aircraft reading light system may comprise a master controller 24, which may be configured for setting a common color shade, in particular a uniform shade of white, for the light outputs 3 of the plurality of aircraft reading lights 2.

Figure 2B:
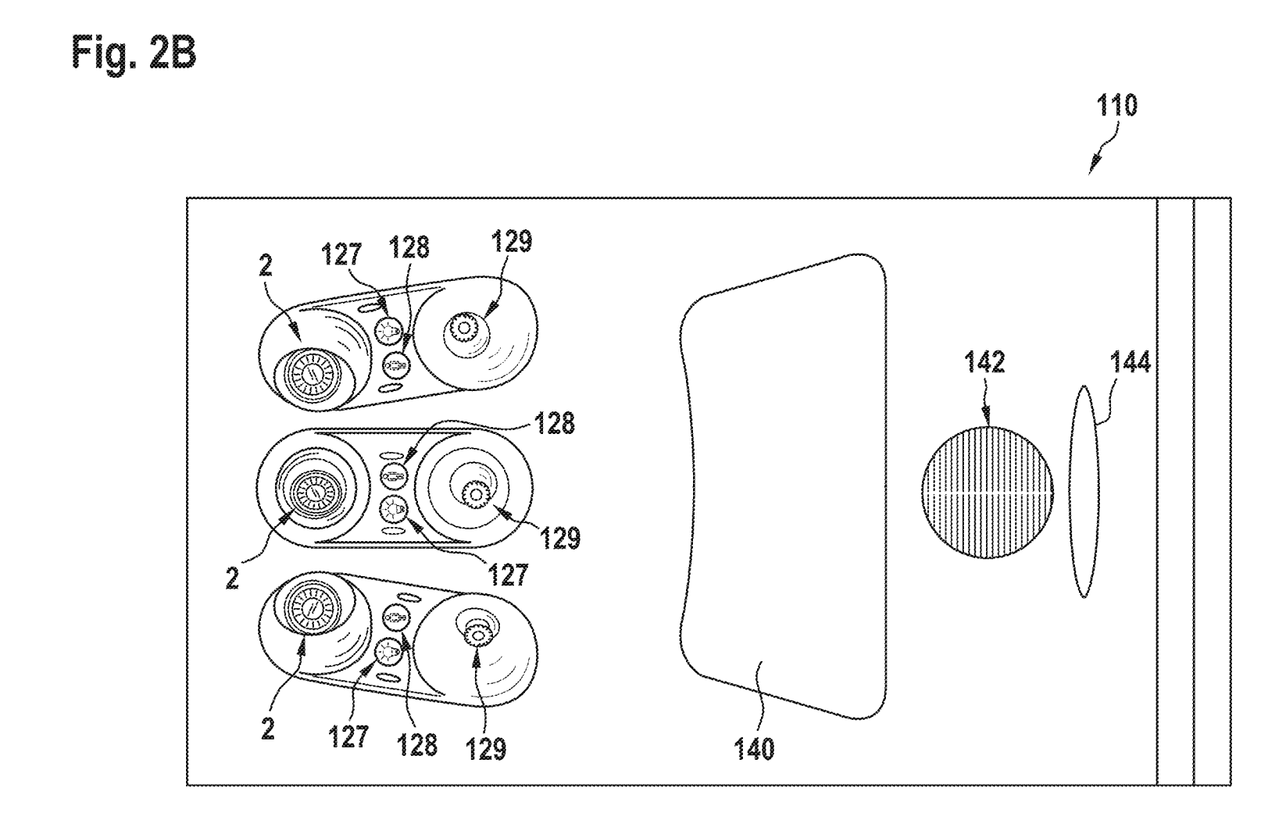
FIG. 2B depicts a schematic view of an overhead passenger service unit ("PSU"), comprising three aircraft reading lights in accordance with exemplary embodiments of the invention.

FIG. 2B depicts a schematic view of an overhead passenger service unit ("PSU") 110 according to an exemplary embodiment of the invention, which may be arranged above the passenger seats 82 of a single seat row, as it is shown in FIG. 2A. FIG. 2B depicts the overhead passenger service unit 110, as it is seen by a passenger sitting on a passenger seat 82 below the overhead passenger service unit 110.

On the side that is shown to the left in FIG. 2B, the overhead passenger service unit 110 comprises a row of three aircraft reading lights 2, which are arranged next to each other.

Six electrical switches 127, 128 are provided to the right side of the aircraft reading lights 2, a respective pair of two switches 127, 128 next to each of the aircraft reading lights 2. A first one of the switches 127 of each pair is configured for switching the adjacent aircraft reading light 2 on and off, and the second switch 128 of each pair is configured for triggering a signal for calling cabin service personnel.

A row of three adjacent gaspers 129 is provided next to the switches 127, 128.

Adjacent to the gaspers 129, there is a movable door 140, which covers a compartment housing at least three oxygen masks. The compartment and the oxygen masks are not visible in FIG. 2B, as they are covered by the movable door 140.

In the event of pressure loss within the passenger cabin 104, the movable door 140 will open, allowing the oxygen masks to drop out of the compartment. Each of the passengers sitting on a passenger seat 82 below the overhead passenger service unit 110 may grasp one of the oxygen masks. After being activated, an oxygen generator, which is not shown in the figures, will supply the oxygen masks with oxygen.

On the side opposite to the gaspers 129, a grid 142 is formed within the overhead passenger service unit 110. A loudspeaker (not shown), which may be used for delivering acoustic announcements to the passengers, may be arranged behind said grid 142.

Next to the grid 142, there is a display panel 144, which may be configured for selectively showing a plurality of visual signs (not shown), such as "non smoking" or "fasten your seat belt" signs. The display panel 144 may be illuminated from behind, in order to deliver visual information to the passengers sitting on the passenger seats 82 below the overhead passenger service unit 110.

An exemplary embodiment of an aircraft reading light 2 according to an exemplary embodiment of the invention is described in the following with reference to FIGS. 3 to 5. This aircraft reading light 2 may be employed in the passenger service unit 110 of FIG. 2B.

Figure 3:
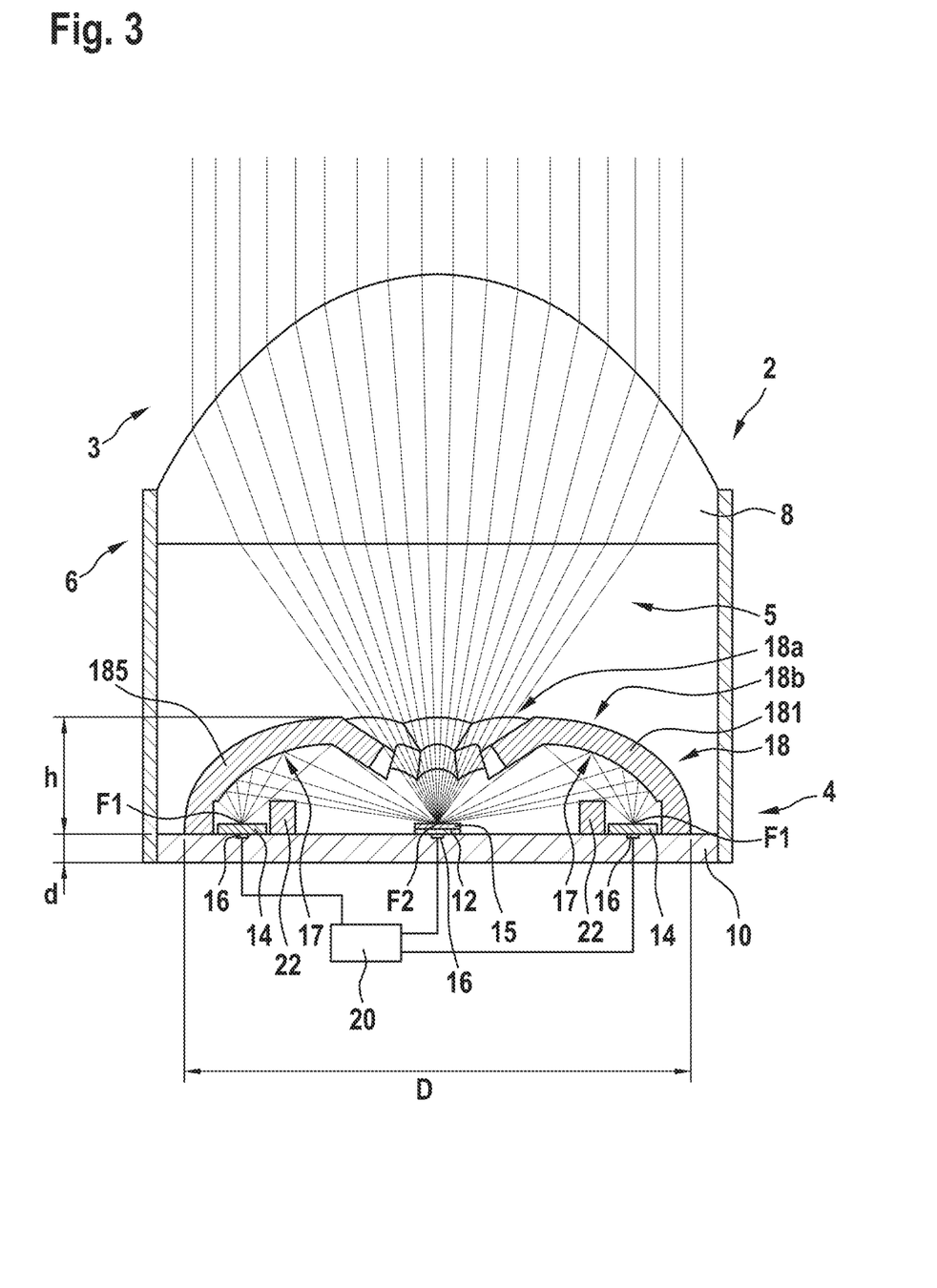
FIG. 3 depicts a schematic cross-sectional view through an aircraft reading light according to an exemplary embodiment of the invention.

FIG. 3 depicts a schematic cross-sectional view through an aircraft reading light 2 according to an exemplary embodiment of the invention.

The aircraft reading light 2 comprises a light emission device 4, which is configured for emitting light 5, and projection optics 6, which is configured for forming a reading light output 3 from the light 5 emitted by the light emission device 4.

The projection optics 6 may be a collimating lens 8, as it is depicted in FIG. 3. Although not shown in the figures, the projection optics 6 may also include at least one reflector and/or at least one shutter in addition to or as an alternative to the lens 8. The lens 8 may also have other optical properties, it may for example be only partially collimating. The projection optics 6 may be configured to provide the reading light output as it is desired in a particular implementation. For example, the projection optics may be designed in accordance with the opening angle of the light 5, as emitted by the light emission device 4, and the distance between the aircraft reading light 2 and the passenger seat.

The projection optics 6 may also comprise a plurality of lenses and/or reflectors. The plurality of lenses and/or reflectors may be movable with respect to each other, in order to allow for adjusting the light output 3, which is formed by the projection optics 6.

The light emission device 4 comprises a support 10, supporting a plurality of light sources. The support 10 may be a board 10, in particular a printed circuit board 10, which comprises conductive paths 16 for supplying electric power to the plurality of light sources.

The light emission device 4 further comprises an annular reflector element 18. The annular reflector element 18, which may also be supported by the support 10, extends in the form of a hood over the plurality of light sources 14.

The annular reflector element 18 may have a height h in the range of between 3 mm and 10 mm, in particular a height h of between 4 mm and 6 mm. The diameter D of the annular reflector element 18 may be in the range of between 10 mm and 25 mm, in particular in the range of between 15 mm and 20 mm.

The support 10 may have a thickness d in the range of between 0.5 mm and 3 mm, in particular a thickness d of about 1 mm.

Figure 4:
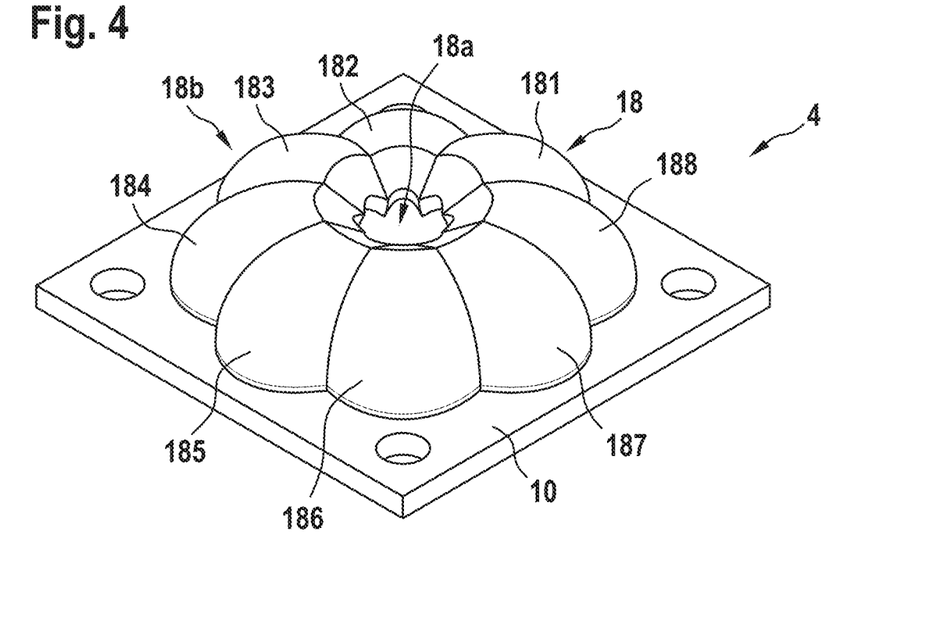
FIG. 4 depicts a perspective view of selected components of the aircraft reading light of FIG. 3.

FIG. 4 depicts a perspective view of the light emission device 4 of the aircraft reading light 2 of FIG. 3, including the annular reflector element 18. FIG. 5 depicts another perspective view of the light emission device 4 of the aircraft reading light 2 of FIG. 3, with the annular reflector element 18 being removed.

The light emission device 4 comprises a white light source 12, which emits white light, when operated, and a plurality of colored light sources 14, which emit colored light, when operated. The colored light sources 14 may emit light having different colors. The colored light sources 14 may in particular include light sources 14 that are configured for emitting red, green, blue, amber, orange or cyan light. Each of the light sources 12, 14 may be an LED or comprise a plurality of LEDs.

Figure 5:
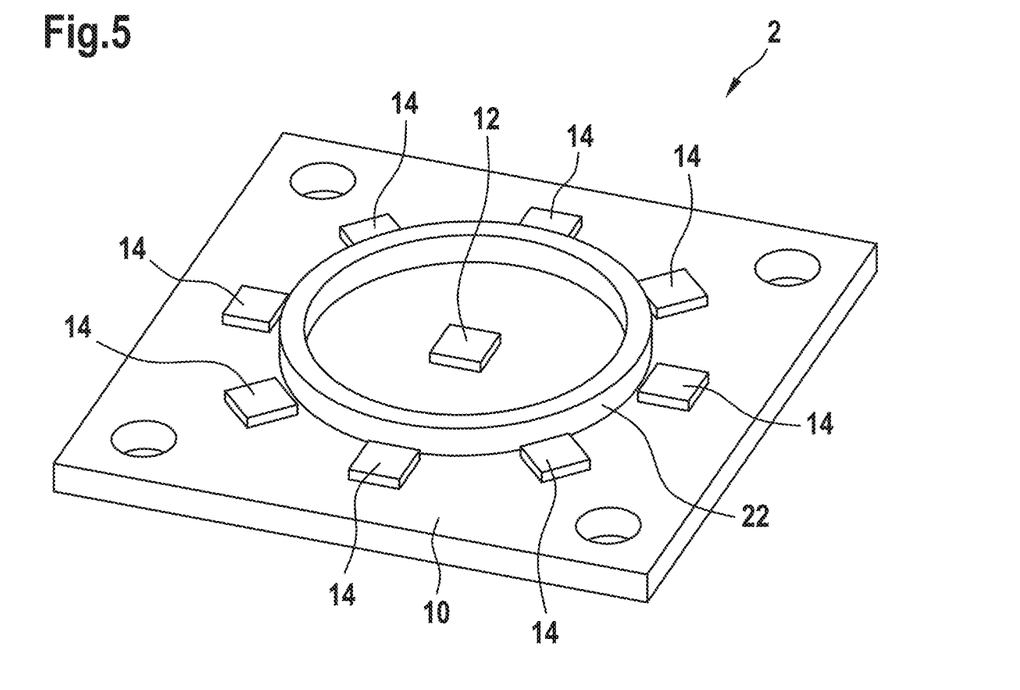
FIG. 5 depicts a perspective view of further selected components of the aircraft reading light of FIG. 3.

In the embodiment depicted in FIGS. 3 to 5, the white light source 12 is arranged at a center of the support 10, and the colored light sources 14 are arranged along a circular contour around the white light source 12. The white light source 12 is arranged at the center of said circular contour.

The light emission device 4 depicted in FIGS. 3 to 5 comprises eight colored light sources 14. The eight colored light sources 14 are arranged in equal angular distances from each other along the circular contour. In an exemplary embodiment, the eight colored light sources 14 may be two red light sources, two green light sources, two blue light sources, and two cyan light sources. For the four different colors, the respective two light sources of the same color may be arranged on opposite sides of the white light source 12. In this way, colored light of each of the colors used may be incident on the white light source 12 from opposite sides, after the reflection by the annular reflector element 18 as described below, and a highly even light emission of white light and colored light by the light emission device 4 may be achieved.

In the embodiment depicted in FIGS. 3 to 5, the annular reflector element 18 has the shape of a petal comprising eight identical optical elements 181-188 (see FIG. 4), which are arranged next to each other along the circumferential direction of the annular reflector element 18. The optical elements 181-188 may also be seen as petal portions of the petal-shaped annular reflector element 18. One of the colored light sources 14 is assigned to each of the optical elements 181-188, respectively.

The arrangement of the light sources 12, 14 and the shape of the annular reflector element 18 depicted in FIGS. 3 to 5 are only exemplary. Other arrangements of the light sources 12, 14 are possible as well. The light emission device 4 may, for example, comprise more or less than eight colored light sources 14. Also, the colored light sources 14 may be arranged in other geometric configurations than along a circular contour, which is centered at the white light source 12.

The annular reflector element 18 has a light transmissive central portion 18a, for example an opening, which is arranged over the white light source 12. The light transmissive central portion 18a may also be formed from a light transmissive material, in particular from a transparent material, instead of an opening.

The annular reflector element 18 further comprises a peripheral portion 18b, which extends around the light transmissive central portion 18a and which is arranged above the colored light sources 14. In the embodiment depicted in FIGS. 3 to 5, the peripheral portion 18b is formed by the optical elements 181-188 of the annular reflector element 18.

The peripheral portion 18b of the annular reflector element 18 is designed as combination of multiple reflectors 17 for directing, in particular reflecting, colored light that is emitted by the colored light sources 14 onto the white light source 12. In the exemplary embodiment of FIGS. 3 to 5, the reflectors 17 are reflective portions of the inside of the annular reflector element 18.

The peripheral portion 18b of the annular reflector element 18 may in particular be shaped so that each of the optical elements/petal portions 181-188 acts as an ellipsoidal reflector 17 for one of colored light sources 14, which is associated with the respective optical element 181-188.

Each of the colored light sources 14 may in particular be arranged in a first focal point F1 of an ellipsoidal reflector 17, which is formed by an associated optical element 181-188 of the annular reflector element 18, and the white light source 12 may be arranged in a second focal point F2 of the respective ellipsoidal reflector 17. An annular reflector element 18 comprising a plurality of ellipsoidal reflectors 17 allows for very efficiently directing the light, emitted by the colored light sources 14, onto the white light source 12.

The white light source 12 is embodied in such a way that the colored light, which is emitted by the colored light sources 14 and directed onto the white light source 12 by the annular reflector element 18, is reflected at the white light source 12. The white light source 12 may in particular be embodied in such a way that the colored light is diffusely reflected at the white light source 12.

The colored light may be reflected by an outer surface of the white light source 12, in particular by an upper surface of the white light source 12, which is facing away from the support 10.

The colored light may also be reflected from an optional reflective coating 15 or an optional reflective element, which may be applied to/arranged on an outer surface of the white light source 12. The optional reflective element may be a diffusor, which is applied to or mounted to the white light source 12 for diffusely reflecting the light that is emitted by the at least one colored light source and directed onto the white light source.

It is also possible that at least a portion of the colored light that is reflected onto the white light source 12 enters into the white light source 12 and is diffusely reflected by internal components of the white light source 12. The colored light may in particular be reflected by a light emitting structure, for example a light emitting semiconductor structure, within the white light source 12.

As a result of reflecting the colored light at the white light source 12, a mixture of light comprising white light, which is emitted by the white light source 12, and colored light, which is emitted by the colored light sources 14, reflected onto the white light source 12, and reflected at the white light source 12, is emitted by the light emission device 4 through the light transmissive central portion 18a of the reflector element 18.

In the embodiment depicted in FIGS. 3 to 5, the light emission device 4 further comprises a shutter element 22, which is arranged between the white light source 12 and the plurality of colored light sources 14. The shape of the shutter element 22 may correspond to the contour along which the colored light sources 14 are arranged. When the colored light sources 14 are arranged along a circular contour, the shutter element 22 may, for example, be an annular structure, which is centered at the white light source 12 and which has a smaller diameter than the circular contour of the plurality of colored light sources 14, as it is depicted in FIG. 5.

The shutter element 22 acts as a light blocker, blocking some of the colored light emitted by the colored light sources 14, in order to prevent the light from directly hitting the white light source 12, in particular from hitting the lateral portions of the white light source 12, without being reflected by the reflectors 17 of the annular reflector element 18. The shutter element 22 may prevent the generation of undesirable colored stray light in random directions, which could result from colored light impacting onto the lateral portions of the white light source 12.

The aircraft reading light 2 further comprises a reading light controller 20, which is configured for controlling the operation of the light sources 12, 14. The reading light controller 20 may in particular be configured for individually controlling the intensity of the light that is emitted by the each of the light sources 12, 14, respectively.

Individually controlling the intensity of the light that is emitted by the each of the light sources 12, 14 allows the reading light controller 20 to not only dim the intensity of the reading light output 3, as emitted by the aircraft reading light 2, but also allows the reading light controller 20 to adjust the color shade of the reading light output 3, emitted by the aircraft reading light 2.

Individually controlling the intensity of the white light emission and the colored light emissions may in particular allow for setting the reading light output 3, emitted by the aircraft reading light 2, to a predetermined shade of white light. By individually adjusting the intensity of the light emitted by each of the light sources 12, 14, the color temperature of the reading light output 3, emitted by the aircraft reading light 2, may be adjusted. The color temperature of the reading light output may, for example, be adjustable between a high color temperature, e.g., a correlated color temperature of more than 4000 K, which corresponds to "cold" white light, and a low color temperature, e.g., a correlated color temperature of less than 3300 K, which corresponds to "warm" white light.

Controlling the intensities of the light that is emitted by the each of the light sources 12, 14 may include setting the intensities of the light that is emitted by the each of the light sources 12, 14, when the aircraft reading light 2 is manufactured or when the aircraft reading light 2 is installed within an aircraft 100 or undergoes maintenance. In such an embodiment, the intensities of the light that is emitted by the each of the light sources 12, 14 are not adjusted during operation of the aircraft reading light 2. Instead, the intensities of the light, emitted by the each of the light sources 12, 14, and the color shade of the reading light output 3, emitted by the aircraft reading light 2, is fixed after the aircraft reading light 2 has been installed within the aircraft 100 and can be changed only during maintenance.

In an alternative embodiment, the reading light controller 20 may allow cabin personnel or passengers of the aircraft 100 to adjust the color shade of the reading light output 3, emitted by the aircraft reading light 2. The color shade may be adapted to the passenger's personal needs and/or in accordance with the aircraft operator's lighting scheme. The intensities of the light that is emitted by the each of the light sources 12, 14 may be individually controllable during the operation of the aircraft reading light 2.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An aircraft reading light with a color-tunable reading light output, the aircraft reading light comprising:
a white light source for emitting white light;
a colored light source for emitting colored light; and
an optical element, which is arranged for directing colored light that is emitted by the colored light source onto the white light source for being diffusely reflected at the white light source to form part of the color-tunable reading light output;
wherein the colored light source is controllable independently from the white light source.

2. An aircraft reading light according to claim 1, wherein the optical element comprises a reflector.

3. An aircraft reading light according to claim 2, wherein the reflector is an ellipsoidal reflector, wherein the colored light source is arranged in a first focal point ($F_1$) of the ellipsoidal reflector, and wherein the white light source is arranged in a second focal point ($F_2$) of the ellipsoidal reflector.

4. An aircraft reading light according to claim 1, wherein the aircraft reading light comprises a plurality of colored light sources.

5. An aircraft reading light according to claim 4, wherein the aircraft reading light comprises a plurality of colored light sources that emit light of different colors.

6. An aircraft reading light according to claim 5, wherein the plurality of colored light sources comprise red, green, blue, and cyan light sources.

7. An aircraft reading light according to claim 4, wherein the aircraft reading light comprises a plurality of optical elements, wherein each of the plurality of optical elements is arranged for directing colored light that is emitted by one of the plurality of colored light sources onto the white light source for being diffusely reflected at the white light source.

8. An aircraft reading light according to claim 7, wherein the plurality of optical elements are part of an integrated optical structure, in particular part of an extended reflector structure.

9. An aircraft reading light according to claim 4, wherein the plurality of colored light sources are arranged around the white light source.

10. An aircraft reading light according to claim 9, wherein the plurality of colored light sources are arranged along a circular contour around the white light source or along an elliptical contour around the white light source or in a polygonal configuration around the white light source.

11. An aircraft reading light according to claim 4, further comprising:
an annular reflector element, arranged over the plurality of colored light sources, wherein a plurality of reflectors are formed on the inside of the annular reflector element, wherein each of the plurality of reflectors is arranged for directing colored light that is emitted by one of the plurality of colored light sources onto the white light source for being diffusely reflected at the white light source.

12. An aircraft reading light according to claim 1, further comprising:
projection optics arranged for forming the reading light output from light that is emitted by the white light source and light that is emitted by the colored light source or by the plurality of colored light sources and reflected by the white light source.

13. An aircraft reading light according to claim 1, further comprising:
a diffusely reflective coating or a diffusely reflective element, which is applied to or mounted to the white light source for diffusely reflecting the light that is emitted by the colored light source or by the plurality of colored light sources and directed onto the white light source.

14. An aircraft reading light according to claim 1, further comprising:
a reading light controller, wherein the reading light controller is configured for controlling an operation of the white light source and for controlling an operation of the colored light source or of the plurality of colored light sources,
wherein the reading light controller is configured for controlling an intensity of a white light emission, which is emitted by the white light source, and for controlling an intensity of a colored light emission or of a plurality of colored light emissions, which is emitted by the colored light source or by the plurality of colored light sources, thus setting a color shade of the reading light output.

15. An aircraft reading light according to claim 1, wherein the white light source and the colored light source or the plurality of colored light sources are mounted to a common light source support, in particular to a common printed circuit board.

16. An aircraft comprising:
an aircraft reading light system that comprises a plurality of aircraft reading lights according claim 1,
wherein the aircraft reading light system is configured to provide the reading light outputs of the plurality of aircraft reading lights with substantially the same color shade.

17. Method of operating an aircraft reading light, which comprises:
a white light source for emitting white light;
at least one colored light source for emitting colored light; and
an optical element, which is arranged for directing colored light that is emitted by the at least one colored light source onto the white light source for being diffusely reflected by the white light source to form part of an aircraft reading light output;
wherein the method includes:
controlling an intensity of a white light emission, which is emitted by the white light source, and/or
controlling at least one colored light emission, which is emitted by the at least one colored light source, thus tuning a color shade of a reading light output of the aircraft reading light,
wherein controlling the intensity of the white light emission and the at least one colored light emission includes setting the reading light output to a predetermined shade of white light.

\* \* \* \* \*